(12) United States Patent
Yao et al.

(10) Patent No.: US 11,064,361 B2
(45) Date of Patent: Jul. 13, 2021

(54) ELECTRONIC DEVICE BINDING METHOD, ELECTRONIC DEVICE, MOBILE TERMINAL AND SERVER

(71) Applicant: BOE Technology Group Co., Ltd., Beijing (CN)

(72) Inventors: Jianli Yao, Beijing (CN); Yao Wang, Beijing (CN); Chengjie Zeng, Beijing (CN); Tieli Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/524,463

(22) Filed: Jul. 29, 2019

(65) Prior Publication Data
US 2020/0154269 A1    May 14, 2020

(30) Foreign Application Priority Data

Nov. 13, 2018 (CN) .......................... 201811345507.5

(51) Int. Cl.
*H04W 12/50* (2021.01)
*H04W 76/18* (2018.01)
(Continued)

(52) U.S. Cl.
CPC ......... *H04W 12/50* (2021.01); *H04L 63/0876* (2013.01); *H04L 63/1441* (2013.01);
(Continued)

(58) Field of Classification Search
CPC ......... H04W 12/003; H04W 12/00522; H04W 12/00512; H04W 12/0017; H04W 76/14;
(Continued)

(56) References Cited

U.S. PATENT DOCUMENTS 9,820,315 B2 * 11/2017 Le Guen ................ H04W 4/38
10,104,599 B2 * 10/2018 Hou ........................ H04W 8/18
(Continued)

FOREIGN PATENT DOCUMENTS

| CN | 104936304 A | 9/2015 |
|---|---|---|
| CN | 106911642 A | 6/2017 |

OTHER PUBLICATIONS

CN 106911642 A. English translation with line numbering, pp. 1-35. (Year: 2017).*
(Continued)

*Primary Examiner* — John M Macilwinen
(74) *Attorney, Agent, or Firm* — Westman, Champlin & Koehler, P.A.

(57) ABSTRACT

The present disclosure discloses an electronic device binding method, an electronic device, and an electronic device binding system. The electronic device binding method includes: receiving, at an electronic device and from the server, a binding request originating from a mobile terminal, and displaying the binding request, wherein the binding request contains device information of the electronic device and user information of the mobile terminal; generating at the electronic device a binding result in response to a first operation of an operator of the electronic device on the binding request, and transmitting the binding result from the electronic device to the server.

19 Claims, 5 Drawing Sheets

(51) Int. Cl.
*H04W 76/14* (2018.01)
*H04L 29/06* (2006.01)
*H04W 12/71* (2021.01)
*H04W 12/77* (2021.01)

(52) U.S. Cl.
CPC ........... *H04W 76/14* (2018.02); *H04W 76/18* (2018.02); *H04W 12/71* (2021.01); *H04W 12/77* (2021.01)

(58) Field of Classification Search
CPC ........ H04W 76/18; H04W 4/70; H04L 63/08; H04L 63/0876; H04L 63/1441
See application file for complete search history.

(56) References Cited

U.S. PATENT DOCUMENTS

| | | | | |
|---|---|---|---|---|
| 10,178,214 B2* | 1/2019 | Ren | ...................... | H04M 1/7253 |
| 10,349,270 B2* | 7/2019 | Hawkins | .............. | G06K 7/1447 |
| 10,397,013 B1* | 8/2019 | Hill | ........................ | H04L 67/306 |
| 2013/0092032 A1* | 4/2013 | Cafferty | .................... | F24C 7/08 |
| | | | | 99/325 |
| 2014/0379860 A1* | 12/2014 | Brocker | ................. | G05B 15/02 |
| | | | | 709/217 |
| 2017/0134378 A1* | 5/2017 | Corcoran | ................ | H04L 63/18 |
| 2018/0206122 A1* | 7/2018 | Bradley | ............ | H04W 12/0609 |
| 2019/0014459 A1* | 1/2019 | Zong | ..................... | H04W 76/14 |

OTHER PUBLICATIONS

CN 204936304 A. English translation with line numbering, pp. 1-35. (Year: 2015).*
M. Fomichev, F. Álvarez, D. Steinmetzer, P. Gardner-Stephen and M. Rollick, "Survey and Systematization of Secure Device Pairing," in IEEE Communications Surveys & Tutorials, vol. 20, No. 1, pp. 517-550. (Year: 2018).*

* cited by examiner

ELECTRONIC DEVICE BINDING METHOD, ELECTRONIC DEVICE, MOBILE TERMINAL AND SERVER

CROSS-REFERENCE TO RELATED APPLICATION(S)

This application claims priority to Chinese Application No. 201811345507.5, entitled "ELECTRONIC DEVICE BINDING METHOD, ELECTRONIC DEVICE, MOBILE TERMINAL AND SERVER" and filed on Nov. 13, 2018, which is incorporated herein by reference in its entirety.

TECHNICAL FIELD

The present disclosure relates to the fields of network technology, and in particular, to an electronic device binding method, an electronic device, a mobile terminal, a server and a computer readable storage medium.

BACKGROUND

With the development of wireless communication technologies and electronic devices, the electronic device has a wireless communication function, a display function, and a data processing function. It has been implemented that the mobile terminal remotely controls the electronic device via a wireless network. The mobile terminal first binds to the electronic device, and then controls the electronic device.

SUMMARY

A first aspect of the present disclosure provides an electronic device binding method, which includes:
 receiving, at an electronic device and from a server, a binding request originating from a mobile terminal, and displaying the binding request, wherein the binding request contains device information of the electronic device and user information of the mobile terminal;
 generating, at the electronic device, a binding result in response to a first operation of an operator of the electronic device on the binding request; and
 transmitting the binding result from the electronic device to the server.

According to an embodiment of the present disclosure, the first operation of the operator of the electronic device on the binding request comprises one of accepting the binding request and rejecting the binding request.

According to an embodiment of the present disclosure, the electronic device binding method further includes:
 generating and displaying, at the electronic device, a two-dimensional code including the device information of the electronic device for scanning by the mobile terminal to generate the binding request.

According to an embodiment of the present disclosure, the two-dimensional code has a first period of validity.

According to an embodiment of the present disclosure, if the first operation of the operator of the electronic device on the binding request is not received within a second period of validity, the binding result is Binding Failed.

According to an embodiment of the present disclosure, the electronic device binding method further includes:
 transmitting, from the mobile terminal to the server, the binding request destined for the electronic device; and
 receiving, at the mobile terminal and from the server, the binding result transmitted by the electronic device.

According to an embodiment of the present disclosure, the electronic device binding method further includes:
 updating and storing a binding list, synchronizing data of the electronic device, and remotely monitoring the electronic device at the mobile terminal if the binding result is Binding Successful; and
 displaying failure prompt information at the mobile terminal if the binding result is Binding Failed.

According to an embodiment of the present disclosure, the electronic device binding method further includes:
 scanning, by the mobile terminal, the two-dimensional code that includes the device information of the electronic device to generate the binding request.

According to an embodiment of the present disclosure, the electronic device binding method further includes:
 displaying failure prompt information at the mobile terminal if the binding result transmitted by the electronic device has not been received at the mobile terminal from the server within a third period of validity.

A second aspect of the present disclosure provides an electronic device, which includes a transceiver, a display and a processor, wherein:
 the transceiver is configured to receive, from a server, a binding request originating from a mobile terminal;
 the display is configured to display the received binding request, wherein the binding request contains device information of the electronic device and user information of the mobile terminal;
 the processor is configured to generate a binding result in response to a first operation of an operator of the electronic device on the binding request; and
 the transceiver is further configured to transmit the binding result to the server.

According to an embodiment of the present disclosure, the processor is further configured to generate a two-dimensional code including the device information of the electronic device, and the display is configured to display the two-dimensional code for scanning by the mobile terminal to generate the binding request.

According to an embodiment of the present disclosure, the two-dimensional code has a first period of validity; and/or
 if the electronic device does not receive the first operation of the operator of the electronic device on the binding request within the second period of validity, the binding result generated by the processor is Binding Failed.

A third aspect of the present disclosure provides an electronic device binding system, which includes an electronic device, a mobile terminal, and a server, wherein
 the mobile terminal is configured to transmit a binding request to the server, wherein the binding request contains device information of the electronic device and user information of the mobile terminal;
 the server is configured to receive the binding request transmitted by the mobile terminal and transmit the binding request to the electronic device;
 the electronic device is configured to receive and display the binding request, generate a binding result in response to a first operation of an operator of the electronic device on the binding request, and transmit the binding result to the server; and
 the server is configured to transmit the binding result to the mobile terminal.

According to an embodiment of the present disclosure, the first operation of the operator of the electronic device on the binding request comprises one of accepting the binding request and rejecting the binding request.

According to an embodiment of the present disclosure, the electronic device is further configured to generate and display a two-dimensional code including the device information of the electronic device, and the mobile terminal is further configured to scan the two-dimensional code to generate the binding request.

According to an embodiment of the present disclosure, the two-dimensional code has a first period of validity.

According to an embodiment of the present disclosure, if the first operation of the operator of the electronic device on the binding request is not received within a second period of validity, the binding result is Binding Failed.

According to an embodiment of the present disclosure, the mobile terminal is further configured to: update and store a binding list, synchronize data of the electronic device, and remotely monitor the electronic device if the binding result is Binding Successful; and display failure prompt information if the binding result is Binding Failed.

According to an embodiment of the present disclosure, the mobile terminal is further configured to: display failure prompt information if the binding result transmitted by the electronic device has not been received at the mobile terminal from the server within a third period of validity.

BRIEF DESCRIPTION OF THE DRAWINGS

The particular embodiments of the present disclosure will be further described in detail below with reference to the accompanying drawings, in which.

DETAILED DESCRIPTION

Figure 1:
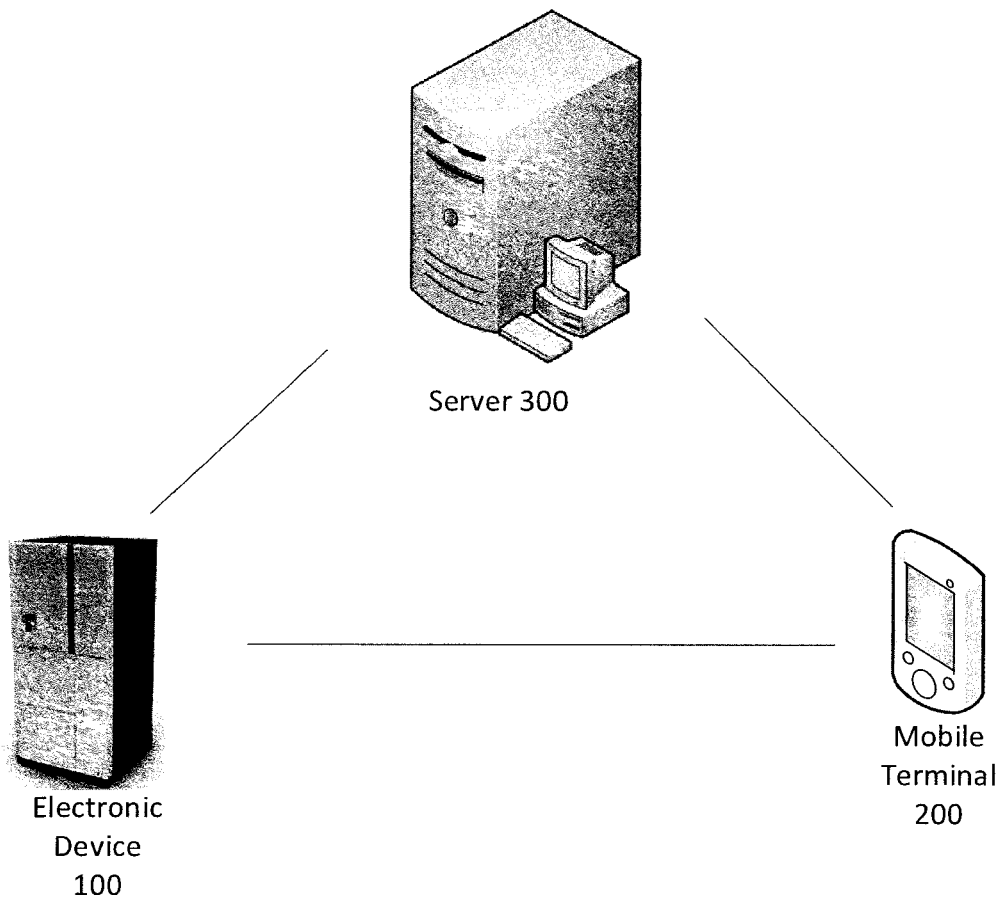
FIG. 1 shows a schematic diagram of a scenario architecture in which an electronic device binding method according to an embodiment of the present disclosure is applied.

In order to explain the present disclosure more clearly, the present disclosure will be further described in conjunction with the preferred embodiments and the accompanying drawings. Similar components in the drawings are denoted by the same reference numbers. It should be understood by those skilled in the art that the following detailed description is illustrative but not limiting, which should not be construed as limiting the scope of the present disclosure.

In the current technology, the electronic device has a wireless communication function, a display function, and a data processing function. It has been implemented that the mobile terminal remotely controls the electronic device via a wireless network. The process of binding the electronic device generally includes: connecting the electronic device to the server via the wireless network, scanning, by the mobile terminal, the electronic device to obtain device information of the electronic device and connecting the mobile terminal to the server, transmitting the device information of the electronic device and currently logged-in user information of the mobile terminal to the server, so that the server establishes a binding relationship between the electronic device and the mobile terminal. In the above binding process, the mobile terminal may complete the binding of the electronic device by scanning a fixed two-dimensional (2D) code printed on the electronic device. Since the two-dimensional code is fixed and there is no binding confirmation during the binding process, the electronic device is prone to be bound maliciously, which seriously affects the user's experience with the electronic device.

FIG. 1 shows a scenario architecture in which the electronic device binding method of the present disclosure is applied. There is an electronic device 100, a mobile terminal 200, and a server 300. The electronic device 100 may be a smart home appliance with a touch display screen, which may be a smart refrigerator, a smart microwave oven, a smart washing machine, a smart food machine, etc. The mobile terminal 200 may be a smart phone, a PAD, or the like.

Figure 2:
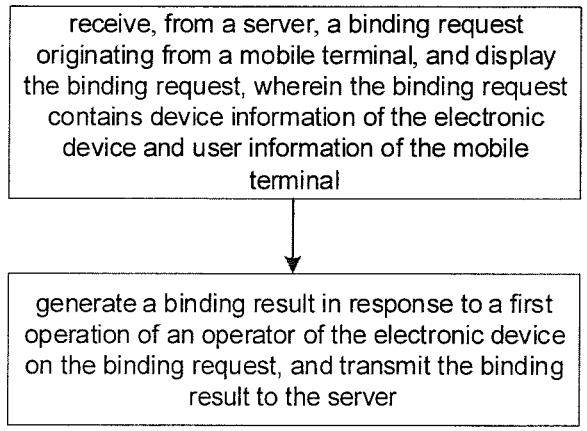
FIG. 2 shows a flowchart of an electronic device binding method according to an embodiment of the present disclosure.

As shown in FIG. 2, an embodiment of the present disclosure provides an electronic device binding method performed by an electronic device, including: receiving, from a server, a binding request originating from a mobile terminal, and displaying the binding request, wherein the binding request contains device information of the electronic device and user information of the mobile terminal; and generating a binding result in response to a first operation of an operator of the electronic device on the binding request, and transmitting the binding result to the server.

Figure 3:
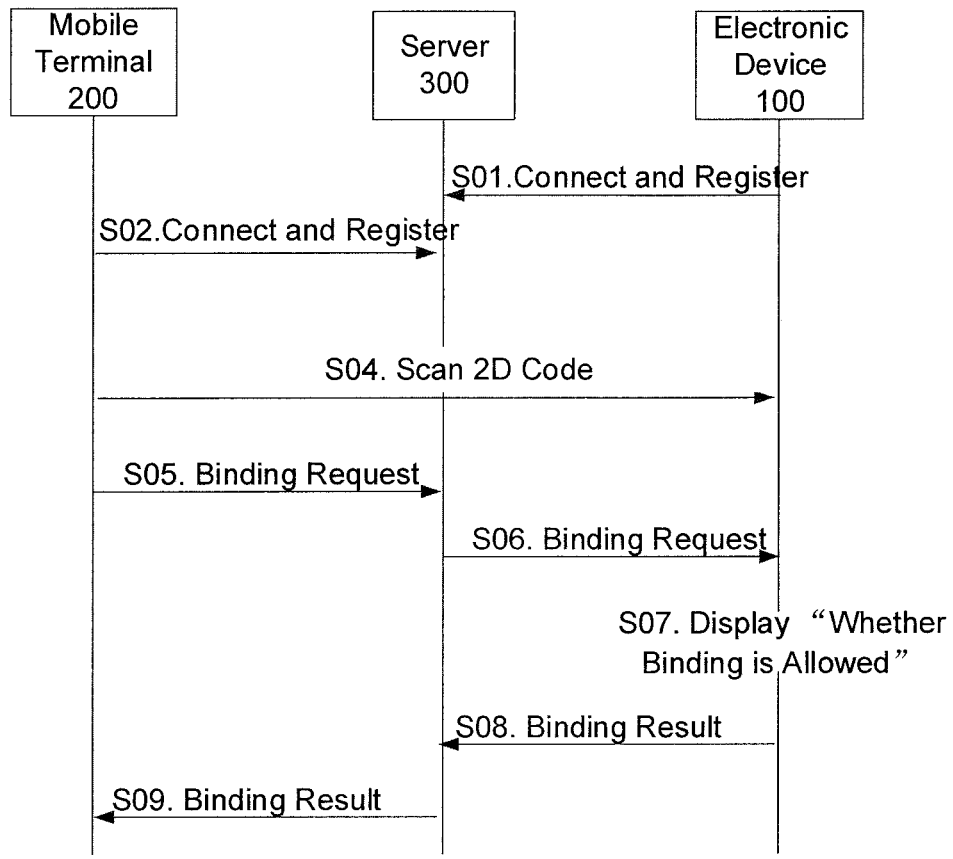
FIG. 3 shows a signal sequence diagram of an electronic device binding method according to an embodiment of the present disclosure.

In a specific embodiment, as shown in FIG. 3, the electronic device binding method according to an embodiment of the present disclosure is implemented by the electronic device 100, the mobile terminal 200, and the server 300. The method may particularly include steps as follows.

In step S01, the electronic device 100 connects to and registers with the server 300.

In this embodiment, the electronic device 100 is a smart refrigerator. In a manufacturing process, device information including a device identification code and hardware information is transmitted to the server for registration. The server may identify the smart refrigerator according to the device identification code. The smart refrigerator also has a wireless communication function, and can be configured to connect to the wireless network, and connect to the server with which it has registered via the wireless network.

The electronic device capable of connecting to the wireless network and being identified by the server is a prerequisite for binding the electronic device. Considering that the electronic device generally registers with the server during the factory setting and connects to the wireless network before the binding process is started, this step can be ignored in the actual binding process.

In step S02, the mobile terminal 200 connects to and registers with the server 300.

In this embodiment, the mobile terminal 200 is a smart phone having a wireless communication function, a touch display function, and a data processing function. The user of the smart phone may download an application software APP used in conjunction with the electronic device on the smart phone, and connect to and register with the server 300. For example, a mobile phone number is used to register user information on the server, including a user name, a nickname, etc. The server 300 may identify the mobile terminal 200 based on the user information.

The server 300 capable of identifying the mobile terminal 200 is a prerequisite for binding the electronic device. In this embodiment, the mobile terminal 200 downloading in advance and using a dedicated application software APP for registration is only for illustrating the technical solution of the present disclosure. The mobile terminal 200 may also connect to the server by using third-party software, such as WeChat, Alipay. That is, the connection and the registration are completed before the binding process is started. Therefore, this step can be ignored in the actual binding process.

The mobile terminal 200 may generate a binding request by inputting the device information of the electronic device 100 in the application APP, or by other means. In a preferred embodiment, the electronic device binding method further includes the following steps.

In step S03, the electronic device 100 generates and displays a two-dimensional code;

In step S04, the mobile terminal 200 scans the two-dimensional code displayed by the electronic device 100.

For example, the operator of the electronic device operates on the touch display screen of the smart refrigerator, and a two-dimensional code is generated by a user adding function of the smart refrigerator, wherein the two-dimensional code includes the device information, such as the device identification code of the electronic device, for scanning by the mobile terminal 200 to generate the binding request.

Further, the two-dimensional code has a first period of validity. For example, the first period of validity is 30 minutes. Then, the two-dimensional code generated by the smart refrigerator is valid within 30 minutes with a two-dimensional code generation time being taken as a timing start point. In an embodiment, the two-dimensional code disappears after 30 minutes. In another embodiment, if the two-dimensional code is scanned by the mobile terminal 200 after 30 minutes, it is displayed that the two-dimensional code is invalid, and no binding can be performed.

In order to further improve the security of binding the electronic device, the smart refrigerator further includes an encryption operation. For example, the device information, the two-dimensional code generation time, and the like are encrypted with MD5 (Message Digest Algorithm 5) to generate the two-dimensional code. The device information, the two-dimensional code generation time and the like may be only decrypted with the specific application software APP to identify the device information, the two-dimensional code generation time and the like in the two-dimensional code. Thus, the malicious binding of the electronic device 100 by capturing the two-dimensional code of the electronic device 100 can be effectively prevented.

In this embodiment, the user scans the two-dimensional code using the APP on the smart phone to identify the device information in the two-dimensional code. Corresponding to the above two-dimensional code having the first period of validity, the binding process can be entered only within the first period of validity, otherwise the information "two-dimensional code is invalid" will be displayed by the APP on the smart phone. Further, corresponding to the above two-dimensional code including the encryption operation, the APP can decrypt and identify the device identification code in the two-dimensional code.

It should be noted that the device information, the first period of validity, and the encryption method in this embodiment are only for illustrating the technical solution of the present disclosure, but not limiting the implementations of the present disclosure. Other different forms of variations or modifications based on the above description also fall into the scope of the present disclosure.

In step S05, the mobile terminal 200 transmits the binding request to the server 300, wherein the binding request includes the device information of the electronic device 100 and the user information of the mobile terminal 200.

In step S06, the server 300 transmits the binding request to the electronic device 100.

In this embodiment, the mobile terminal 200 may generate the binding request by inputting the device information of the electronic device 100 in the application APP, or by scanning, by the mobile terminal 200, the two-dimensional code within the first period of validity; and transmit the binding request to the server 300, the binding request including the user information and the device information for facilitating to be identified by the server 300.

The server 300 receives the binding request, and transmits the binding request to the corresponding electronic device 100 according to the device information included in the binding request, wherein the binding request includes the user information for facilitating to be identified by the electronic device 100.

To further prevent delays caused by untimely server push or network instability, the electronic device binding method further includes: performing a timing operation at the mobile terminal 200. When the mobile terminal 200 transmits the binding request to the server 300, the mobile terminal 200 starts timing, requesting that a binding result is received within a third period of validity. That is, it needs to receive from the server the binding result transmitted by the electronic device within the third period of validity. If the binding result transmitted by the electronic device has not been received from the server within the third period of validity, failure prompt information is displayed. That is, when the mobile terminal 200 transmits the binding request, the mobile terminal 200 starts timing at the same time. For example, the third period of validity may be set to be 30 seconds, and the timing may be in a form of a count-up or a countdown. Accordingly, the APP may display on the interface a countdown, a progress bar or an hourglass, etc., which may effectively alleviate the user's anxiety for waiting and improve the user experience.

In step S07, the electronic device 100 displays "Whether Binding is Allowed", and generates a binding result in response to a first operation of the operator of the electronic device on the binding request.

In the embodiment, the smart refrigerator receives the binding request, and displays the user information on the touch display screen of the smart refrigerator to facilitate confirmation by the operator of the electronic device. For example, the user name in the user information is displayed and a binding confirmation inquiry dialog box "Whether To Allow The User To Bind The Device?" is popped up, so that the operator of the electronic device performs a selection operation to confirm acceptance of the binding or rejection of the binding.

To further improve the security of the electronic device binding process, when the electronic device 100 displays the binding confirmation inquiry, the electronic device 100 starts timing, requiring that the first operation of the operator of the electronic device on the binding request needs to be completed within a second period of validity, that is, the binding confirmation needs to be completed within the second period of validity. If the first operation of the operator of the electronic device on the binding request is not received within the second period of validity, the binding result is Binding Failure. For example, the second period of validity is 10 s, and the user should select "Binding Accepted" or "Binding Rejected" within the 10 s' timing. If the 10 s is exceeded, the binding result is Binding Failure.

In step S08, the electronic device 100 transmits the binding result to the server 300.

In step S09, the server 300 transmits a binding result to the mobile terminal 200.

In the present embodiment, in response to the first operation of the operator to select "Binding Accepted" or "Binding Rejected", the smart refrigerator generates the binding result and transmits the binding result to the server 300, and the binding result is forwarded to the APP via the server 300. At this point, the electronic device binding process is finished. The security of the electronic device binding process may be improved by setting the validity period of the two-dimensional code and performing timing at both the electronic device and the mobile terminal, which effectively prevents the electronic device from being maliciously bound, and can improve the user's experience with the electronic device.

Further, in an embodiment, if the binding result is Binding Successful, the method further includes: the mobile terminal updating and storing a binding list, synchronizing data of the electronic device, and remotely monitoring the electronic device. That is, the data of the electronic device is transmitted via the server, and the electronic device can be monitored from the mobile terminal in real time. If the binding result is Binding Failure, the method further includes: the mobile terminal displaying the failure prompt information, that is, displaying "Binding Failure" at the mobile terminal.

Corresponding to the electronic device binding methods provided in the foregoing embodiments, an embodiment of the present disclosure further provides an electronic device. Since the electronic device provided by the present embodiment of the present disclosure is corresponding to the electronic device binding methods provided by the foregoing embodiments, the foregoing embodiments are also applicable to the electronic device provided in the present embodiment, which thus will not be described in detail in the present embodiment.

Figure 4:
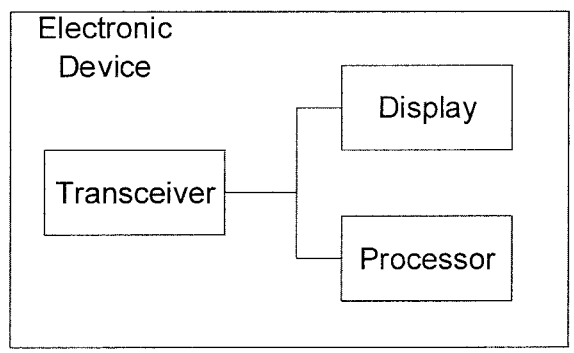
FIG. 4 shows a structural block diagram of an electronic device according to an embodiment of the present disclosure.

As shown in FIG. 4, an embodiment of the present disclosure further provides an electronic device, including a transceiver, a display, and a processor. The transceiver is configured to receive, from a server, a binding request originating from a mobile terminal; the display is configured to display the received binding request, wherein the binding request contains device information of the electronic device and user information of the mobile terminal; the processor is configured to generate a binding result in response to a first operation of an operator of the electronic device on the binding request; and the transceiver is further configured to transmit the binding result to the server.

In an embodiment, the processor is further configured to generate a two-dimensional code including the device information of the electronic device, and the display is configured to display the two-dimensional code for scanning by the mobile terminal to generate the binding request.

In an embodiment, the two-dimensional code has a first period of validity. In an embodiment, if the electronic device does not receive the first operation of the operator of the electronic device on the binding request within the second period of validity, the binding result generated by the processor is Binding Failed.

Figure 5:
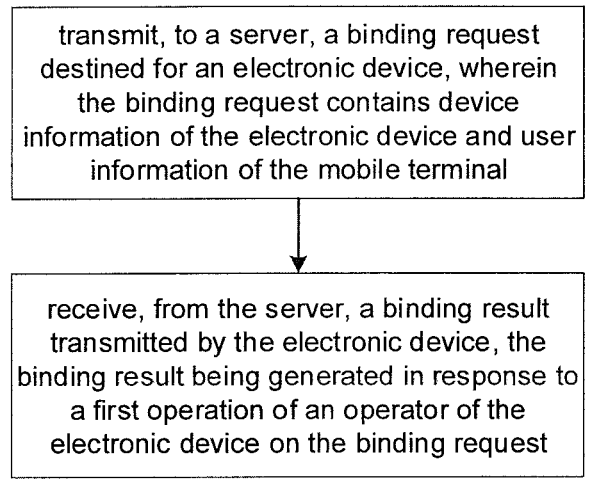
FIG. 5 shows a flowchart of an electronic device binding method according to another embodiment of the present disclosure.

As shown in FIG. 5, an embodiment of the present disclosure provides an electronic device binding method performed by a mobile terminal, including: transmitting, from the mobile terminal to the server, a binding request destined for the electronic device, wherein the binding request contains device information of the electronic device and user information of the mobile terminal; and receive, by the mobile terminal from the server, a binding result transmitted by the electronic device, the binding result being generated in response to a first operation of an operator of the electronic device on the binding request.

In a preferred embodiment, if the binding result is Binding Successful, the method further includes: updating and storing the binding list, synchronizing data of the electronic device, and remotely monitoring the electronic device at the mobile terminal. If the binding result is Binding Failure, the method further includes: displaying the failure prompt information at the mobile terminal.

Further, the method further includes: scanning by the mobile terminal a two-dimensional code generated by the electronic device that includes the device information of the electronic device to generate the binding request.

In another embodiment, the two-dimensional code has a first period of validity. Further, if the binding result transmitted by the electronic device has not been received from the server within a third period of validity, the display is further configured to display failure prompt information.

Figure 6:
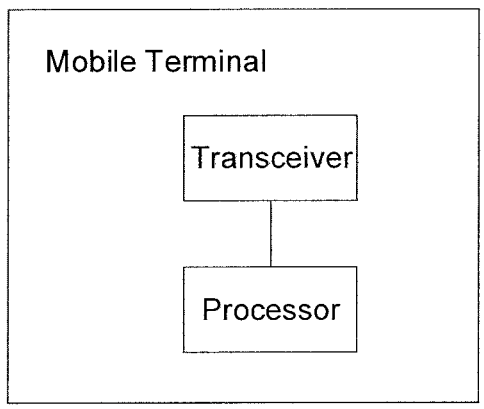
FIG. 6 shows a structural block diagram of a mobile terminal according to an embodiment of the present disclosure.

Correspondingly, as shown in FIG. 6, an embodiment of the present disclosure provides a mobile terminal, including a transceiver and a processor. The processor is configured to generate a binding request, the binding request containing device information of the electronic device and user information of the mobile terminal; and the transceiver is configured to transmit, to the server, a binding request destined for the electronic device, and receive, from the server, a binding result transmitted by the electronic device, the binding result being generated in response to a first operation of an operator of the electronic device on the binding request.

In an embodiment, if the binding result is Binding Successful, the processor is further configured to update and store a binding list, synchronize data of the electronic device, and remotely monitor the electronic device. If the binding result is Binding Failed, the display is further configured to display failure prompt information.

In an embodiment, the processor is further configured to scan a two-dimensional code generated by the electronic device that includes the device information of the electronic device to generate the binding request.

In an embodiment, the two-dimensional code has a first period of validity.

In another embodiment, if the binding result transmitted by the electronic device has not been received from the server within a third period of validity, the display is further configured to display failure prompt information.

Figure 7:
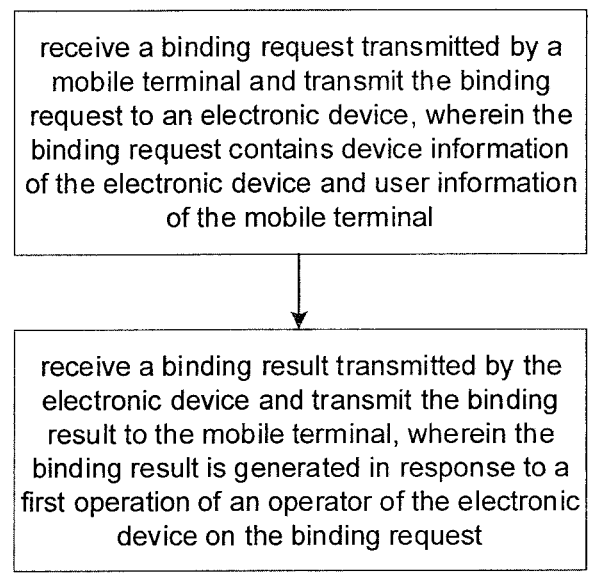
FIG. 7 shows a flowchart of an electronic device binding method according to another embodiment of the present disclosure.

As shown in FIG. 7, an embodiment of the present disclosure provides an electronic device binding method performed by a server, including: receiving a binding request transmitted by a mobile terminal and transmitting the binding request to an electronic device, wherein the binding request contains device information of the electronic device and user information of the mobile terminal; and receiving a binding result transmitted by the electronic device and transmitting the binding result to the mobile terminal, wherein the binding result is generated in response to a first operation of an operator of the electronic device on the binding request.

Figure 8:
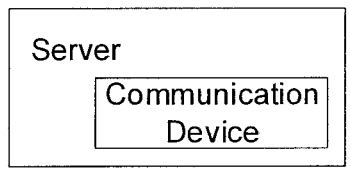
FIG. 8 shows a structural block diagram of a server according to an embodiment of the present disclosure.

Correspondingly, as shown in FIG. 8, an embodiment of the present disclosure provides a server including a communication device. The communication device receives a binding request transmitted by a mobile terminal and transmits the binding request to an electronic device, wherein the binding request contains device information of the electronic device and user information of the mobile terminal; the communication device receives a binding result transmitted by the electronic device and transmits the binding result to the mobile terminal, wherein the binding result is generated in response to a first operation of an operator of the electronic device on the binding request.

Figure 9:
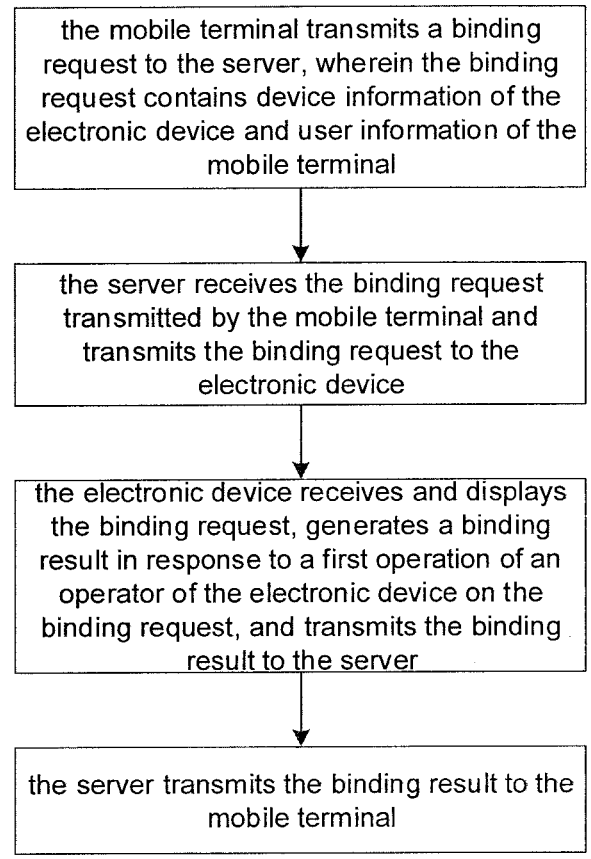
FIG. 9 shows a flowchart of an electronic device binding method according to another embodiment of the present disclosure.

As shown in FIG. 9, an embodiment of the present disclosure provides an electronic device binding method, including: transmitting a binding request from a mobile terminal to a server, wherein the binding request contains device information of the electronic device and user information of the mobile terminal; transmitting the binding request from the server to the corresponding electronic device according to the device information in the binding request; at the electronic device, receiving and displaying the binding request, generating a binding result in response to a first operation of an operator of the electronic device on the binding request, and transmitting the binding result to the server; and transmitting the binding result from the server to the mobile terminal.

Figure 10:
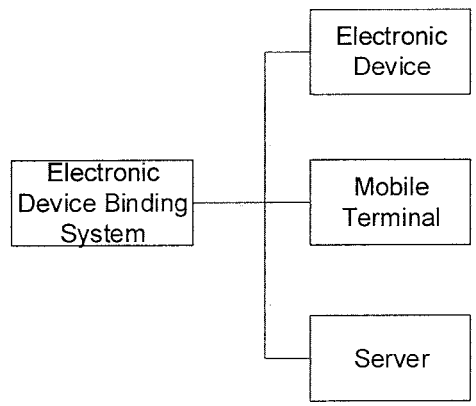
FIG. 10 shows a structural block diagram of an electronic device binding system according to an embodiment of the present disclosure.

Correspondingly, as shown in FIG. 10, an embodiment of the present disclosure provides an electronic device binding system, including an electronic device, a mobile terminal, and a server, wherein the mobile terminal transmits a binding request to the server, wherein the binding request contains device information of the electronic device and user information of the mobile terminal; the server receives the binding request transmitted by the mobile terminal and transmits the binding request to the electronic device; the electronic device receives and displays the binding request, generates a binding result in response to a first operation of an operator of the electronic device on the binding request, and transmits the binding result to the server; and the server transmits the binding result to the mobile terminal.

Another embodiment of the present disclosure provides a computer readable storage medium having stored thereon a computer program that, when executed by a processor of an electronic device, performs steps of: receiving from a server a binding request originating from a mobile terminal, and displaying the binding request, wherein the binding request contains device information of the electronic device and user information of the mobile terminal; and generating a binding result in response to a first operation of an operator of the electronic device on the binding request, and transmitting the binding result to the server.

Another embodiment of the present disclosure provides a computer readable storage medium having stored thereon a computer program that, when executed by a processor of a mobile terminal, performs steps of: transmitting to a server a binding request destined for an electronic device, wherein the binding request contains device information of the electronic device and user information of the mobile terminal; and receiving from the server a binding result transmitted by the electronic device, the binding result being generated in response to a first operation of an operator of the electronic device on the binding request.

Another embodiment of the present disclosure provides a computer readable storage medium having stored thereon a computer program that, when executed by a processor of a server, performs steps of: receiving a binding request transmitted by a mobile terminal and transmitting the binding request to an electronic device, wherein the binding request contains device information of the electronic device and user information of the mobile terminal; and receiving a binding result transmitted by the electronic device and transmitting the binding result to the mobile terminal, wherein the binding result is generated in response to a first operation of an operator of the electronic device on the binding request.

In practical applications, the computer readable storage medium may employ any combination of one or more computer readable media. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination thereof. More specific examples (non-exhaustive lists) of the computer readable storage medium include: electrical connections having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combinations thereof. In this embodiment, the computer readable storage medium may be any tangible medium that contains or stores a program, which may be used by or in connection with an instruction execution system, an apparatus or a device.

A computer readable signal medium may include a data signal that is propagated in the baseband or as a part of a carrier, carrying computer readable program codes. Such propagated data signals may take a variety of forms, including but not limited to, electromagnetic signals, optical signals, or any suitable combinations thereof. The computer readable signal medium may also be any computer readable medium other than the computer readable storage medium, which may transmit, propagate, or transport a program for use by or in connection with the instruction execution system, apparatus or device.

Program codes embodied on the computer readable medium may be transmitted by any suitable media, including but not limited to radio, wire, fiber optic cable, RF, etc., or any suitable combinations thereof.

Computer program codes for performing the operations of the present disclosure may be written in one or more programming languages, or combinations thereof, including an object oriented programming language, such as Java, Smalltalk, C++, and a conventional procedural programming language, such as "C" language or similar programming languages. The program coded may be executed entirely on the user computer, partly on the user computer, as a stand-alone software package, partly on the user computer and partly on the remote computer, or entirely on the remote computer or server. In a case of the remote computer, the remote computer may be connected to the user computer through any kind of network, including a local area network (LAN) or a wide area network (WAN), or may be connected to an external computer (via Internet connection e.g., using an Internet service provider).

The present disclosure addresses the problem of security risks in the existing binding process of the electronic devices, proposing an electronic device binding method, which enables the process of binding a mobile terminal to an electronic device to be more secure and complete by adding a display and confirmation process on the electronic device, thereby solving the problem in the current technology, effectively improving the security of the binding process, preventing the electronic device from being maliciously bound, and effectively improving the user experience.

It is apparent that the above-described embodiments of the present disclosure are merely illustrative of the present disclosure, but are not intended to limit the embodiments of the present disclosure. It is to be understood by those skilled in the art that various other variations and modifications may be made based on the above description, all embodiments may not be exhaustive herein, and obvious variations and modifications extended from the technical solutions of the present disclosure still fall into the scope of the present disclosure.

We claim:

1. An electronic device binding method, comprising:
receiving, at an electronic device and from a server, a binding request originating from a mobile terminal, and displaying the binding request, wherein the binding request contains device information of the electronic device and user information of the mobile terminal;
generating, at the electronic device, a binding result in response to a first operation of an operator of the electronic device on the binding request,
transmitting the binding result from the electronic device to the server, and
receiving, at the mobile terminal and from the server, the binding result transmitted by the electronic device.

2. The electronic device binding method according to claim 1, wherein the first operation of the operator of the electronic device on the binding request comprises one of accepting the binding request and rejecting the binding request.

3. The electronic device binding method according to claim 1, further comprising:
generating and displaying, at the electronic device, a two-dimensional code including the device information of the electronic device for scanning by the mobile terminal to generate the binding request.

4. The electronic device binding method according to claim 3, wherein
the two-dimensional code has a first period of validity.

5. The electronic device binding method according to claim 3, wherein
if the first operation of the operator of the electronic device on the binding request is not received within a second period of validity, the binding result is Binding Failed.

6. The electronic device binding method according to claim 1, further comprising:
transmitting, from the mobile terminal to the server, the binding request destined for the electronic device.

7. The electronic device binding method according to claim 6, further comprising:
updating and storing a binding list, synchronizing data of the electronic device, and remotely monitoring the electronic device at the mobile terminal if the binding result is Binding Successful; and
displaying failure prompt information at the mobile terminal if the binding result is Binding Failed.

8. The electronic device binding method according to claim 6, further comprising:
scanning, by the mobile terminal, a two-dimensional code that includes the device information of the electronic device to generate the binding request.

9. The electronic device binding method according to claim 8, further comprising:
displaying failure prompt information at the mobile terminal if the binding result transmitted by the electronic device has not been received at the mobile terminal from the server within a third period of validity.

10. An electronic device, comprising a transceiver, a display and a processor, wherein:
the transceiver is configured to receive, from a server, a binding request originating from a mobile terminal;
the display is configured to display the received binding request, wherein the binding request contains device information of the electronic device and user information of the mobile terminal;
the processor is configured to generate a binding result in response to a first operation of an operator of the electronic device on the binding request; and
the transceiver is further configured to transmit the binding result to the server, which forwards the binding result to the mobile terminal.

11. The electronic device according to claim 10, wherein the processor is further configured to generate a two-dimensional code including the device information of the electronic device, and the display is configured to display the two-dimensional code for scanning by the mobile terminal to generate the binding request.

12. The electronic device according to claim 11, wherein the two-dimensional code has a first period of validity; and/or
if the electronic device does not receive the first operation of the operator of the electronic device on the binding request within a second period of validity, the binding result generated by the processor is Binding Failed.

13. An electronic device binding system, comprising an electronic device, a mobile terminal, and a server, wherein
the mobile terminal is configured to transmit a binding request to the server, wherein the binding request contains device information of the electronic device and user information of the mobile terminal;
the server is configured to receive the binding request transmitted by the mobile terminal and transmit the binding request to the electronic device;
the electronic device is configured to receive and display the binding request, generate a binding result in response to a first operation of an operator of the electronic device on the binding request, and transmit the binding result to the server; and
the server is further configured to transmit the binding result to the mobile terminal.

14. The electronic device binding system according to claim 13, wherein the first operation of the operator of the electronic device on the binding request comprises one of accepting the binding request and rejecting the binding request.

15. The electronic device binding system according to claim 13, wherein the electronic device is further configured to generate and display a two-dimensional code including the device information of the electronic device, and the mobile terminal is further configured to scan the two-dimensional code to generate the binding request.

16. The electronic device binding system according to claim 15, wherein
the two-dimensional code has a first period of validity.

17. The electronic device binding system according to claim 15, wherein
if the first operation of the operator of the electronic device on the binding request is not received within a second period of validity, the binding result is Binding Failed.

18. The electronic device binding system according to claim 17, wherein the mobile terminal is further configured to:
update and store a binding list, synchronize data of the electronic device, and remotely monitor the electronic device if the binding result is Binding Successful; and
display failure prompt information if the binding result is Binding Failed.

19. The electronic device binding system according to claim 13, wherein the mobile terminal is further configured to:
display failure prompt information if the binding result transmitted by the electronic device has not been received at the mobile terminal from the server within a third period of validity.

* * * * *